United States Patent [19]

Miyoshi et al.

[11] Patent Number: 4,952,458
[45] Date of Patent: Aug. 28, 1990

[54] MAGNETIC RECORDING MEDIUM

[75] Inventors: Takahito Miyoshi; Akihiro Matsufuji; Nobuyuki Yamamoto, all of Odawara, Japan

[73] Assignee: Fuji Photo Film Co., Ltd., Japan

[21] Appl. No.: 346,328

[22] Filed: Apr. 28, 1989

Related U.S. Application Data

[63] Continuation of Ser. No. 810,251, Dec. 17, 1985, abandoned.

[30] Foreign Application Priority Data

Dec. 18, 1984 [JP] Japan ................... 59-268083
Dec. 18, 1984 [JP] Japan ................... 59-268084

[51] Int. Cl.$^5$ ............................................. G11B 23/00
[52] U.S. Cl. ..................... 428/323; 428/329; 428/408; 428/694; 428/900
[58] Field of Search ............... 428/694, 695, 900, 329, 428/408; 427/128, 131

[56] References Cited

U.S. PATENT DOCUMENTS

| | | | |
|---|---|---|---|
| 4,275,113 | 6/1981 | Saito | 428/900 |
| 4,420,540 | 12/1983 | Ogawa | 428/695 |
| 4,448,842 | 5/1984 | Yamaguchi | 428/695 |
| 4,474,848 | 10/1984 | Yamaguchi | 428/695 |
| 4,537,833 | 8/1985 | Kasuga et al. | 428/900 |
| 4,539,257 | 9/1985 | Ryoke et al. | 428/323 |

FOREIGN PATENT DOCUMENTS

| | | | |
|---|---|---|---|
| 1946554 | 3/1971 | Fed. Rep. of Germany | 427/128 |
| 0138726 | 7/1985 | Japan | 428/695 |

*Primary Examiner*—Paul J. Thibodeau
*Attorney, Agent, or Firm*—Ostrolenk, Faber, Gerb & Soffen

[57] ABSTRACT

A magnetic recording medium comprising a nonmagnetic support and a magnetic recording layer provided on said support, in which said magnetic recording layer comprises:

a ferromagnetic metal powder having a specific surface area of not less than 40 m$^2$/g;
a fatty acid having a melting point of lower than 50° C.;
a fatty acid having a melting point of not lower than 50° C.; and
a fatty acid ester.

6 Claims, No Drawings

MAGNETIC RECORDING MEDIUM

This is a continuation of application Ser. No. 810,251 filed on Dec. 17, 1985 now abanoned.

BACKGROUND OF THE INVENTION

1. Field of the Invention

The present invention relates to a magnetic recording medium. More particularly, the invention relates to an improvement of a magnetic recording medium comprising a nonmagnetic support and a magnetic recording layer.

2. Description of Prior Arts

A magnetic recording medium such as an audio-tape, a video-tape, or a recording medium employed in a computer system, basically comprises a nonmagnetic support and a magnetic recording layer provided on the support. The magnetic recording layer comprises a ferromagnetic powder such as a needle crystalline powder of $\gamma$-$Fe_2O_3$, Co-containing ferromagnetic iron oxide, or $CrO_2$ dispersed in a binder. Recently, the demand for a higher density recording system has increased, and hence studies of a magnetic recording medium using a ferromagnetic metal powder containing metallic iron, nickel, cobalt or the like, in place of the conventional oxide-type ferromagnetic powder have been made.

The ferromagnetic metal powder has been employed as a ferromagnetic powder of a recording medium of a computer system. The ferromagnetic metal powder is high in a coercive force (Hc) and a residual flux density (Br) and moreover is stable in a wide temperature range. For these reasons, the ferromagnetic metal powder has been also paid attention to for the use in such magnetic recording media as a video-tape or an audio-tape.

Particularly in the case of a video-tape, recently the recording wavelength has been shortened, and further the width of track has been narrowed. Accordingly, the demand for higher density recording is particularly high in the video-tape art.

It is known that in the magnetic recording layer using a ferromagnetic metal powder, the higher density recording and improved electromagnetic conversion characteristics are attained by smoothing the surface of the magnetic recording layer. It is also known, however, that the smoothened surface of the recording layer results in an increase of friction between the surface and the members of a recording device against which the recording medium runs. The increase of friction causes damage to the magnetic recording layer and further may cause dropping off of the recording layer from the support. Particularly, a video-tape sometimes is placed under severe conditions such as the so-called "still mode", and the increase of the friction shortens endurance of the recording layer in the still mode (i.e., still life). Accordingly, improvement of the running endurance (or running property), namely, endurance in the running operation, is desired.

It is known that the running endurance of a magnetic recording layer is improved by incorporating an abrasive (i.e., hard particles) such as corundum, silicon carbide or chromium oxide in the recording layer. However, the effect of incorporation of an abrasive is shown only where the abrasive is incorporated in a large amount, and a magnetic recording layer containing a large amount of an abrasive likely causes extreme abrasion of a magnetic head placed in contact with the running recording layer. Further, the incorporation of a large amount of an abrasive is unfavorable to the electromagnetic conversion characteristics of the recording medium. Furthermore, the incorporated abrasive is apt to be easily released to adhere to the surface of the magnetic head.

Moreover, there are other problems in the art of a video-tape. Recently, the potable video tape recorder system has become popular, and is employed under various conditions such as at a very low temperature or under a very humid condition. Therefore, it is desired that a magnetic recording medium such as video tape functions satisfactorily even under the severe conditions. Thus, a magnetic recording medium is desired to show not only high electromagnetic conversion characteristics and high endurance under severe running conditions such as the still mode, but also high running endurance under wide variation of the surrounding conditions such as wide variation of ambient temperature and humidity.

SUMMARY OF THE INVENTION

It is an object of the present invention to provide a magnetic recording medium improved in the electromagnetic conversion characteristics and running endurance.

It is another object of the invention to provide a magnetic recording medium showing satisfactory running endurance under wide variation of the surrounding conditions such as wide variation of ambient temperature and humidity.

There is provided by the present invention a magnetic recording medium comprising a nonmagnetic support and a magnetic recording layer provided on said support, in which said magnetic recording layer comprises:

a ferromagnetic metal powder having a specific surface area of not less than 40 $m^2/g$;

a fatty acid having a melting point of lower than 50° C.;

a fatty acid having a melting point of not lower than 50° C.; and a fatty acid ester.

The magnetic recording layer of the magnetic recording medium preferably contains further a carbon black powder having a mean particle size of 60–120 m$\mu$ and a DBP(dibutyl phthalate)-absorbing capacity of not more than 100 ml/100 g.

DETAILED DESCRIPTION OF THE INVENTION

A magnetic recording medium of the invention comprises a nonmagnetic support and a magnetic recording layer provided on the support. The magnetic recording layer comprises a ferromagnetic metal powder dispersed in a binder.

There is no specific limitation on the nonmagnetic support employable in the present invention.

The material of the nonmagnetic support is not particularly limited and can be selected, for example, from plastic materials such as polyethylene terephthalate, polypropylene, polycarbonate, polyethylene naphthalate, polyamide, polyamideimide, polyimide, and metallic foils such as aluminum foil and stainless steel foil. The thickness of the support film generally is in the range of 3 to 50 $\mu$m and preferably in the range of 5 to 30 $\mu$m.

The nonmagnetic support may have a back layer (or backing layer) on the opposite side of the side where a magnetic recording layer is to be coated.

The magnetic recording medium of the invention has the above-described nonmagnetic support coated thereupon with a magnetic recording layer comprising a ferromagnetic metal powder dispersed in a specific binder composition.

More specifically, the magnetic recording medium of the invention uses a ferromagnetic metal powder having a specific surface area of not less than 40 m²/g.

As a typical ferromagnetic metal powder, there can be mentioned a ferromagnetic alloy powder containing a metal component of at least 75 wt. % in which at least 80 wt. % of the metal component comprises at least one ferromagnetic metal or metal alloy (e.g., Fe, Co, Ni, Fe-Co, Fe-Ni, Co-Ni, Fe-Zn-Ni or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. These ferromagnetic metal powders are already known, and can be prepared by known methods.

For instance, a ferromagnetic metal powder can be prepared by the following known processes.

(a) a process of reducing a double organic acid salt (typically, an oxalate) by the use of a reducing gas such as hydrogen;

(b) a process of reducing a ferric oxide and/or other metal oxide by the use of a reducing gas such as hydrogen to obtain Fe particle, Fe-Co particle, etc.;

(c) a process of thermally decomposing a metal carbonyl compound;

(d) a process of reducing a ferromagnetic metal in an aqueous solution in the presence of a reducing agent such as sodium borohydride, hypophosphite or hydrazine;

(e) a process of electrolyzing a ferromagnetic metal solution at a mercury electrode and separating the deposited ferromagnetic metal powder from mercury; and (f) a process of evaporating a metal in an inert atmosphere under reduced pressure to obtain a fine powder.

The ferromagnetic metal powder normally used is in a needle shape, grain shape, dice shape, rice shape or plate shape. In the ferromagnetic metal powder employed in the magetic recording medium of the invention, the specific surface area preferably is not less than 45 m²/g.

In the magnetic recording medium of the invention, the magnetic recording layer contains:

a fatty acid having a melting point of lower than 50° C.;

a fatty acid having a melting point of not lower than 50° C.; and a fatty acid ester.

The combination of the above-mentioned two kinds of the fatty acids and the fatty acid ester is particularly effective to improve the running endurance of the recording medium. More specificatlly, it is assumed that the fatty acid having a melting point of lower than 50° C. particularly serves to improve the running endurance under low temperature conditions; the fatty acid having a melting point of not lower than 50° C. particularly serves to improve the running endurance under high temperature conditions; and the fatty acid ester particularly serves to enhance the effects of both fatty acids. Thus, the combined use of the fatty acids and fatty acid ester is effective to provide a magnetic recording medium that functions satisfactorily under various surrounding conditions from low temperature to high temperature conditions. Further, the combined use of the fatty acids and fatty acid ester is favorable to well disperse the ferromagnetic metal powder in the process of the preparation of the magnetic recording layer.

The fatty acid having a melting point of lower than 50° C. may be a saturated or unsaturated fatty acid, and examples include tridecylic acid, lauric acid, undecylic acid, capric acid, erucic acid, cetoleic acid, elaidic acid, and oleic acid. The fatty acids can be employed singly or in combination.

The fatty acid having a melting point of not lower than 50° C. may be a saturated or unsaturated fatty acid, and examples include myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceroic acid. The fatty acids can be employed singly or in combination.

The fatty acid ester may be a lower alkylester of a saturated or unsaturated fatty acid. The alkyl group preferably contains 1–6 carbon atoms, and more preferably 1–4 carbon atoms. Examples of the alkylester include methylester, ethylester, propylester and butylester. Examples of the saturated or unsaturated fatty acid include tridecylic acid, lauric acid, undecylic acid, capric acid, erucic acid, cetoleic acid, elaidic acid, oleic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceroic acid. The fatty acid esters can be employed singly or in combination.

In the recording layer of the magnetic recording medium of the invention, the total amount of the two fatty acids and the fatty acid ester is preferably in the range of 1 to 10%, more preferably 1 to 9%, particularly 2 to 8%, by weight based on the amount of the ferromagnetic metal powder in the recording layer.

The total amount of the two fatty acids is preferably in the range of 1 to 80%, more preferably 20 to 60%, by weight based on the amount of the total amount of the two fatty acids and the fatty acid ester. The ratio of the fatty acid having a melting point of lower than 50° C. to the fatty acid having a melting point of not lower than 50° C. preferably is 1/10 to 10/1.

The recording layer of the magnetic recording medium of the invention preferably contains a powdery carbon black. The carbon black preferably has a mean particle size of 60–120 mμ and a DBP(dibutyl phthalate)-absorbing capacity of not more than 100 ml/100 g, more preferably from 40 to 80 ml/100 g. The carbon black is preferably contained in the magnetic recording layer in an amount of not more than 10% by weight, more preferably 0.1 to 5% by weight, based on the amount of the ferromagnetic metal powder in the recording layer. The carbon black is considered to act as a solid lublicant to enhance the increase of the running endurance in conjunction with the combined use of the fatty acids and fatty acid ester.

The magnetic recording layer preferably contains further an abrasive such as α-Fe₂O₃, α-Al₂O₃, or Cr₂O₃.

There is no specific limitation on the binder material employed for the formation of the magnetic recording layer. Examples of the binder material include cellulose derivatives (e.g., nitrocellulose and cellulose acetate), vinyl chloride/vinyl acetate copolymer resins, (e.g., vinyl chloride/vinyl acetate copolymers, vinyl chloride/vinyl acetate/vinylalcohol copolymers, and vinyl chloride/vinyl acetate/maleic acid anhydride copolymers), vinylidene chloride resins (e.g., vinylidene chloride/vinyl chloride copolymers and vinylidene chloride/acrylonitrile copolymers), polyester resins (e.g., alkyd resin and linear polyester), acrylic resins (e.g., acrylic acid/acrylonitrile copolymer and methyl acrylate/acrylonitrile copolymer), polyvinyl acetal resin, polyvinyl resin, phenoxy resin, epoxy resin, butadiene/acrylonitrile copolymer resin, polyurethane resin and urethane epoxy resin. Preferred are vinyl chloride/vinyl acetate/vinyl alcohol copolymers, vinyl chloride/vinyl acetate/maleic anhydride copolymers, and vinyl chloride/vinyl acetate/acrylic acid copolymers. Most preferred are vinyl chloride/vinyl acetate/maleic anhydride copolymers.

The binder may be employed in an amount of 10 to 100%, preferably 15 to 50%, by weight of the ferromagnetic metal powder in the recording layer.

The magnetic recording layer may contain other additives such as known granular fillers having a mean size of 0.01 to 0.8 $\mu$m, preferably 0.06 to 0.4 $\mu$m. Examples of material of the granular filler include graphite, tungsten disulfide, boron nitride, calcium carbonate, titanium dioxide, magnesium oxide, zinc oxide, calcium oxide, lithopone, and talc.

The magnetic recording medium of the present invention can be produced by a process comprising the steps of first by preparing a magnetic paint (or dispersion) containing the ferromagnetic metal powder, binder, lublicants, and optional additives such as dispersing agent, abrasive, stabilizer and antistatic agent in an organic solvent such as methyl ethyl ketone, or cyclohexane, then applying this magnetic paint onto a nonmagnetic support, upon which the magnetic paint is processed to dryness. Generally, a magnetic recording layer is formed by applying the magnetic paint directly on a nonmagnetic support, but it is also possible to provide an adhesive layer or a subbing layer between the magnetic paint layer and the nonmagnetic support.

The dispersing agent employable is, for example, a soap of an alkali metal (e.g., lithium, sodium or potassium) or an alkaline earth metal (e.g., magnesium, calcium or barium) of a fatty acid having 12 to 22 carbon atoms (e.g., caprylic acid, capric acid, lauric acid, myristic acid, palmitic acid, stearic acid, oleic acid, elaidic acid, linoleic acid, linolenic acid); a fatty acid amide derived from the fatty acid, an aliphatic amine, a higher alcohol, a polyalkyleneoxide alkylphosphate ester, an alkylphosphate ester, an alkylborate ester, a sarcosinate, an alkyl ether ester, a fluorine atom-containing compound, or other known dispersing agent such as a trialkylpolyolefin quaternary ammonium salt and lecithin.

The antistatic agent is, for example, a natural surfactant (e.g., saponin), a nonionic surfactant (e.g., of alkylenoxide type, of glycerol type, or of glycidol type), a cationic surfactant (e.g., higher alkylamine, quarternary ammonium salt, heterocyclic phosphonium compound such as pyridine or sulfonium compound), an anionic surfactant (e.g., carboxylic acid, sulfonic acid, phosphate or compound having acid groups such as sulfuric ester-type or phosphoric ester type), or an amphoteric surfactant (e.g., amino acid, amino sulfonic acid, sulfuric or phosphoric ester of amino alcohol).

The procedure for preparing a magnetic paint as well as the procedure for coating the magnetic paint as such are well known. Also known are other treating processes such as a drying process, a magnetic orienting process, a smoothing process using a calender roll, and a slitting process. Accordingly, there is no need of further giving a detailed description therein.

The magnetic recording layer preferably has a thickness (after dryness) generally of approx. 0.5 to 10 $\mu$m, preferably of approx. 1.5 to 7.0 $\mu$m.

The magnetic recording medium of the invention is particularly advantageous in the case that it is applied to a video tape. A video tape according to the invention shows remarkably high video output. Moreover, this video tape shows an improved running endurance, and hence it shows a relatively long still life.

The examples and the comparison examples of the present invention are given below. In the following examples, the expression "parts" means "parts by weight", otherwise specified.

EXAMPLE 1

The components indicated below were kneaded to give a dispersion.

| | |
|---|---|
| Ferromagnetic metal alloy powder (Fe-Ni alloy, Fe: 95 wt. %, Ni: 5 wt. %, specific surface area(S-BET): 45 m$^2$/g) | 100 parts |
| Vinyl chloride/vinyl acetate/maleic anhydride copolymer (400 × 110A available from Nippon Geon Co., Ltd., Japan) | 11 parts |
| Polyurethane resin (N-2301 available from Nippon Polyurethane Co., Ltd., Japan) | 2 parts |
| Carbon black (mean particle size: 94 $\mu$m, DBP-absorbing capacity: 60 ml/100 g) | 2 parts |
| Oleic acid | 1 part |
| Stearic acid | 1 part |
| Butyl stearate | 1 part |
| $\alpha$-Alumina (particle size: 0.3–0.5 $\mu$m) | 5 parts |
| Methyl ethyl ketone | 500 parts |

To the dispersion was added 8 parts of polyisocyanate (Colonate L, available from Nippon Polyurethane Co., Ltd.) in 100 parts of methyl ethyl ketone, and the mixture was further kneaded to give a magnetic paint.

The magnetic paint was coated over a polyethylene terephthalate support (thickness: 10 $\mu$m) to give a coated layer of a thickness 3.0 $\mu$m (thickness in dry state). The support with the coated layer was treated with an electromagnet at 3,000 gauss under wet condition to give a magnetic orientation. After the coated layer was dried, the layer was subjected to supercalendering. The resulting sheet was slitted to give video tapes (VHS type) having a width of ½ inch.

The obtained video tape was examined with respect to regeneration output and still life.

The obtained video tape was run in contact with a ferrite head installed in a video tape recorder V-500D (tradename of Toshiba Corp., Japan). The running speed was set at a half of the ordinary running speed. The regeneration output at a recording wavelength of 1 $\mu$m was observed to compare the regeration output given by a reference video tape (video tape using a Co-containing ferromagnetic iron oxide, produced by Fuji Photo Film Co., Ltd.).

It was observed that the tested video tape gave a video output of 5 dB (relative value in which a video output of the reference tape recorded with a signal of the same wavelength was set to 0 dB).

Still life of the video tape was examined by running the video tape in contact with a magnetic head in the above-mentioned video recorder under a still mode at 5° C., 30% RH and 40° C., 80% RH. The examination was made to determine the term (i.e., still life) at the end of which one-third of the regenerated video image diminished. The tested video tape had a still life of longer than 120 min. (which was satisfactory in a practical use) under either testing condition.

EXAMPLE 2

The procedure of Example 1 was repeated except that the oleic acid was replaced with lauric acid to give a video tape for the same testing.

It was observed that the tested video tape gave a relative video output of 5 dB.

Still lifes of the video tape at 5° C., 30% RH and 40° C., 80% RH were longer than 120 min.

EXAMPLE 3

The procedure of Example 1 was repeated except that the ferromagnetic metal powder of S-BET 45 $m^2/g$ was replaced with ferromagnetic metal powder of S-BET 40 $m^2/g$ to give a video tape for the same testing.

It was observed that the tested video tape gave a relative video output of 2 dB.

Still lifes of the video tape at 5° C., 30% RH and 40° C., 80% RH were longer than 120 min.

COMPARISON EXAMPLE 1

The procedure of Example 1 was repeated except that no oleic acid was used to give a video tape for the same testing.

It was observed that the tested video tape gave a relative video output of 5 dB.

Still lifes of the video tape at 5° C., 30% RH and 40° C., 80% RH were 40 min. and 60 min., respectively.

COMPARISON EXAMPLE 2

The procedure of Example 1 was repeated except that no stearic acid was used to give a video tape for the same testing.

It was observed that the tested video tape gave a relative video output of 5 dB.

Still lifes of the video tape at 5° C., 30% RH and 40° C., 80% RH were 80 min. and 40 min., respectively.

COMPARISON EXAMPLE 3

The procedure of Example 1 was repeated except that no butyl stearate was used to give a video tape for the same testing.

It was observed that the tested video tape gave a relative video output of 5 dB.

Still lifes of the video tape at 5° C., 30% RH and 40° C., 80% RH were 40 min. and 40 min., respectively.

COMPARISON EXAMPLE 4

The procedure of Example 1 was repeated except that the ferromagnetic metal powder of S-BET 45 $m^2/g$ was replaced with a Co-containing ferromagnetic ferrite powder of S-BET 30 $m^2/g$ to give a video tape for the same testing.

It was observed that the tested video tape gave a relative video output of as low as 0 dB.

Still lifes of the video tape at 5° C., 30% RH and 40° C., 80% RH were longer than 120 min.

We claim:

1. In a magnetic recording medium comprising a non-magnetic support and a magnetic recording layer provided on said support, the improvement wherein said magnetic recording layer comprises:
   a ferromagnetic metal powder having a specific surface area of not less than 40 $m^2/g$;
   a fatty acid having a melting point of lower than 50° C. which is oleic or lauric acid;
   a fatty acid having a melting point of not lower than 50° C. which is stearic acid;
   a fatty acid ester which is butyl stearate; and
   carbon black powder having a mean particle size of 60–120 $\mu m$ and a dibutyl phthalate-absorbing capacity of not more than 100 ml/100 g in an amount of not more than 10% by weight based on the amount of the ferromagnetic metal powder;
   the total amount of the two fatty acids and the fatty acid ester being in the range of 1 to 10% by weight based on the total amount of the ferromagnetic metal powder, wherein the total amount of the two fatty acids is in the range of 1 to 80% by weight based on the amount of the two fatty acids and the fatty acid ester, wherein the ratio of the fatty acid having a melting point of lower than 50° C. to the fatty acid having a melting point of not lower than 50° C. is in the range of 1/10 to 10/1.

2. The magnetic recording medium as claimed in claim 1, wherein the dibutylphthalate-absorbing capacity of the carbon black powder ranges from 40 to 80 ml/100 g.

3. The magnetic recording medium as claimed in claim 1, wherein said magnetic recording layer contains an abrasive selected from the group consisting of $\alpha$-$Fe_2O_3$, $\alpha$-$Al_2O_3$, and $Cr_2O_3$.

4. The magnetic medium as claimed in claim 1, wherein the total amount of fatty acids and fatty ester is 2 to 8%, and the total amount of the two fatty acids is 20 to 60% of the total amount of fatty acids and fatty acid ester.

5. The magnetic medium as claimed in claim 1, in which the ferromagnetic metal powder has a specific surface area of not less than 45 $m^2/g$.

6. The magnetic recording medium as claimed in claim 5, wherein the total amount of the two fatty acids is in the range of 20 to 60% by weight based on the amount of the two fatty acids and the fatty acid ester.

* * * * *

UNITED STATES PATENT AND TRADEMARK OFFICE
CERTIFICATE OF CORRECTION

PATENT NO. : 4,952,458
DATED : August 28, 1990
INVENTOR(S) : Miyoshi et al.

It is certified that error appears in the above-identified patent and that said Letters Patent is hereby corrected as shown below:

Col. 6, line 34, change "$\mu$m" to --m$\mu$--.

Col. 8, line 25, change "$\mu$m" to --m$\mu$--.

Signed and Sealed this

Fourteenth Day of July, 1992

Attest:

DOUGLAS B. COMER

*Attesting Officer*  *Acting Commissioner of Patents and Trademarks*